United States Patent
Kulha et al.

[11] Patent Number: 5,973,611
[45] Date of Patent: Oct. 26, 1999

[54] HANDS-FREE REMOTE ENTRY SYSTEM

[75] Inventors: Steven P. Kulha, Shelby Township; Joseph S. Bolsenga, Wixom, both of Mich.

[73] Assignee: UT Automotive Dearborn, Inc., Dearborn, Mich.

[21] Appl. No.: 08/410,915

[22] Filed: Mar. 27, 1995

[51] Int. Cl.$^6$ .................................................. G08C 19/00
[52] U.S. Cl. .............................. 340/825.31; 340/825.69; 340/825.72; 307/10.1
[58] Field of Search ........................ 340/825.31, 825.69, 340/825.71, 825.72, 825.34; 307/10.1, 10.5, 10.2; 455/343

[56] References Cited

U.S. PATENT DOCUMENTS

| | | | |
|---|---|---|---|
| 4,596,985 | 6/1986 | Bongard et al. | 340/825.69 |
| 4,688,036 | 8/1987 | Hirano et al. | 340/825.69 |
| 4,763,121 | 8/1988 | Tomoda et al. | 340/825.54 |
| 4,794,268 | 12/1988 | Nakano et al. | 307/10 AT |
| 4,847,614 | 7/1989 | Keller | 340/825.56 |
| 4,942,393 | 7/1990 | Waraksa et al. | 340/825.72 |
| 5,109,152 | 4/1992 | Takagi et al. | 235/380 |
| 5,109,221 | 4/1992 | Lambropoulos et al. | 340/825.69 |
| 5,115,236 | 5/1992 | Kohler | 340/825.69 |
| 5,144,677 | 9/1992 | Pogue, Jr. et al. | 380/45 |
| 5,204,672 | 4/1993 | Brooks | 340/825.71 |
| 5,280,267 | 1/1994 | Reggiani | 340/426 |
| 5,319,364 | 6/1994 | Waraksa et al. | 340/825.72 |
| 5,442,341 | 8/1995 | Lambropoulos | 340/825.31 |
| 5,541,585 | 7/1996 | Duhame et al. | 340/825.69 |

OTHER PUBLICATIONS

FCC Documentation, General Motors Corporation ABO0202T No Date.

*Primary Examiner*—William A. Cuchlinski, Jr.
*Assistant Examiner*—Yonel Beaulieu
*Attorney, Agent, or Firm*—Howard & Howard

[57] ABSTRACT

The present invention teaches a hands-free remote entry system primarily for vehicles. This system comprises a base transceiver having wake-up sensors for automatically detecting an object. Once an object is detected, a transmitter within the base transceiver transmits a wake-up/data signal to a fob transceiver. A wake-up receiver within the fob transceiver receives the wake-up/data signal. Upon receipt of the wake-up/data signal, the fob transceiver transmits an identification/data signal, via a transmitter, back to a receiver in the base transceiver. In response to receiving the identification signal, output drivers from the base transceiver actuate a door lock system and an auto theft system.

25 Claims, 7 Drawing Sheets

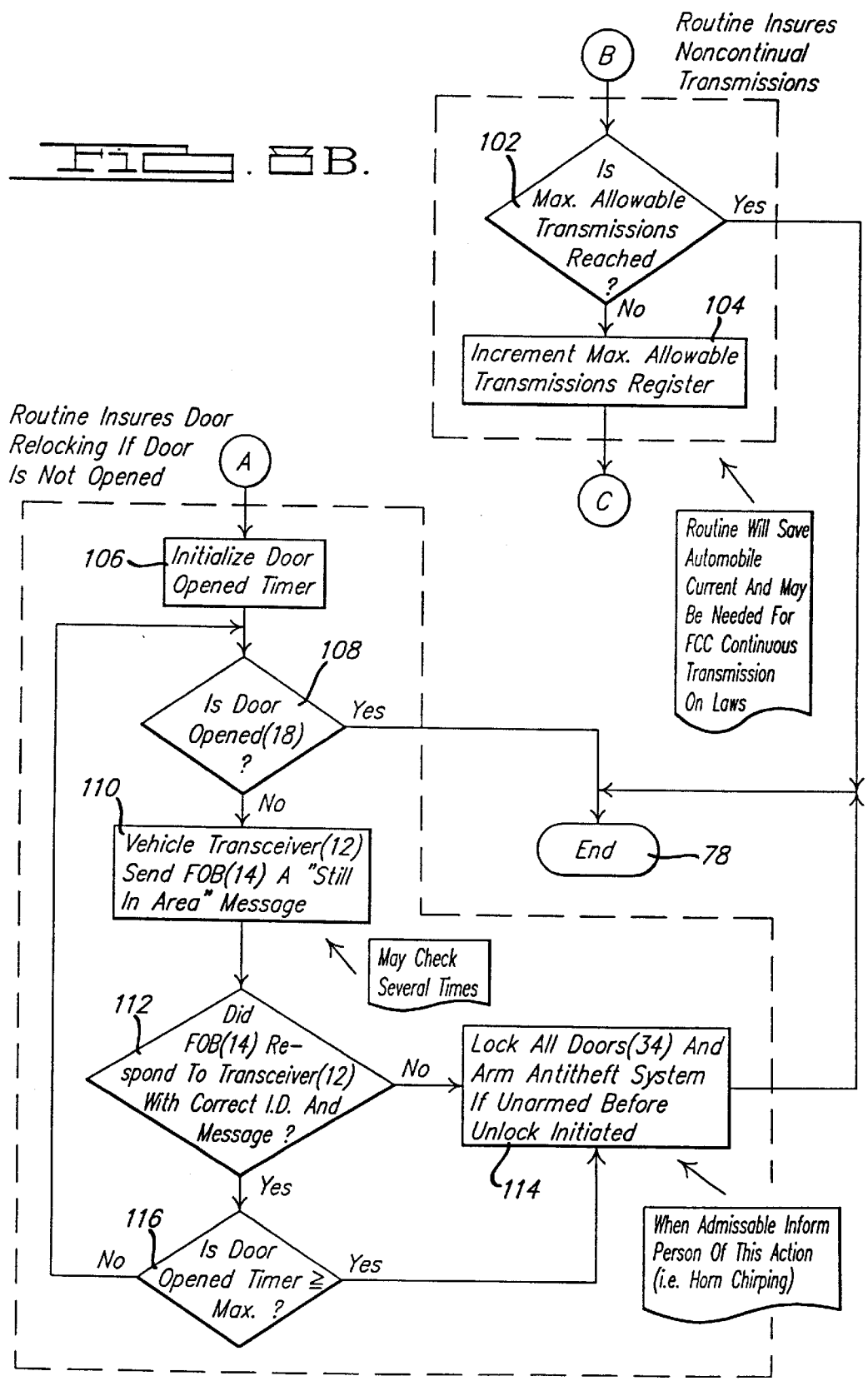

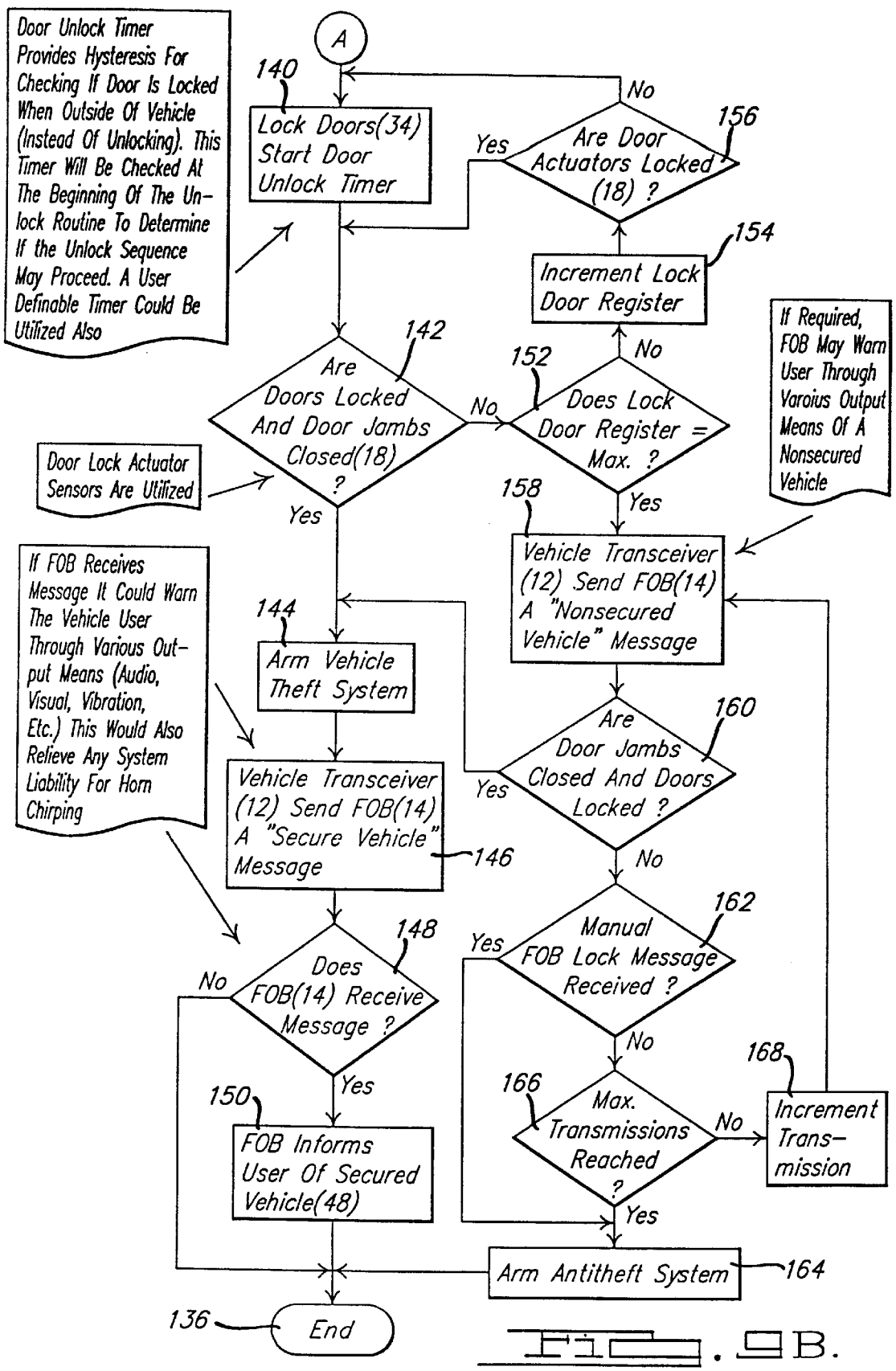

HANDS-FREE REMOTE ENTRY SYSTEM

BACKGROUND OF THE INVENTION

I. Field of the Invention

This invention relates generally to remote entry systems and, more particularly, to a hands-free remote entry system for vehicles.

II. Discussion of the Related Art

Remote entry systems for vehicles have been in use for several years. These systems provide safety and convenience for a user entering or exiting a vehicle. Some of the typical features offered by these systems allow the user to lock/unlock doors and arm/disarm auto theft systems in a remote manner.

For instance, many remote entry systems will utilize a key fob with an infrared transmitter which is received by an infrared sensor positioned on the vehicle. When the user is within range, the user actuates a button on the key fob to either lock or unlock all the vehicle doors. Concurrently with the locking or unlocking, an anti-theft system is typically armed or disarmed. However, one disadvantage of this type of system is that the user must manually actuate the key fob to achieve the desired result.

In order to attempt to eliminate this disadvantage, some remote entry systems now operate in a hands-free manner. For example, one system currently being utilized employs a key fob which uses an internal motion sensor. As a user walks or moves, the key fob on the user detects this motion and continuously transmits a signal while the motion is detected. If the user is near the vehicle, the vehicle will receive this signal and unlock all the doors. Thereafter, the system will "time out" and lock all the doors.

Thus, this system eliminates the need for the user to manually actuate the key fob. However, this system has several disadvantages. First, if the user is merely walking past the vehicle with the key fob, the vehicle will inadvertently unlock the doors when not required. This would leave the vehicle subsequently open to theft or vandalism. Second, when the user is inside the vehicle, the user may unintentionally cause the doors to unlock by moving the key fob inside the vehicle. This may allow a child to open the vehicle door as the vehicle is moving or allow an intruder to enter the vehicle while the user attempts to lock the vehicle. Finally, battery life of the key fob is also greatly reduced. For example, if the key fob is in the user's pocket and the user is taking a walk, the key fob will continuously transmit signals and thereby degrade the battery.

Another hands-free system currently in use either employs the key fob or the vehicle to periodically emit a signal, such as every 100 milliseconds. As the user approaches the vehicle, the key fob or the vehicle receives this signal and unlocks the door. Again, this system may cause the vehicle to be unlocked unintentionally and inadvertently, as well as reduce the battery life of the key fob or the vehicle because of the continuous periodic transmissions. Additionally, both of the above systems typically open all of the doors and not just the entering door. This allows the possibility of having an intruder enter through another door.

What is needed then is a hands-free remote entry system which does not suffer from the above-mentioned disadvantages. This will, in turn, eliminate the inadvertent and unintentional locking or unlocking of the vehicle doors, increase battery life in the key fob and the vehicle, eliminate opening all the doors simultaneously and eliminate the continuous transmission of unnecessary signals. It is, therefore, an object of the present invention to provide such a hands-free remote entry system and method therefor.

SUMMARY OF THE INVENTION

In accordance with the teachings of the present invention, a hands-free remote entry system for a vehicle is disclosed. This system allows a user to lock/unlock vehicle doors and arm/disarm an auto theft system in a hands-free remote manner. This is basically achieved by the user approaching the vehicle with a fob transceiver. A vehicle transceiver in the vehicle detects the user approaching the vehicle and wakes up the fob transceiver with a wake-up signal. The fob transceiver then transmits an identification signal to the vehicle transceiver which causes the vehicle transceiver to lock or unlock the vehicle.

In the preferred embodiment, a vehicle transceiver includes wake-up sensors for automatically detecting an approaching user. Upon detection, a transmitter within the vehicle transceiver transmits a wake-up/data signal which is received by a wake-up receiver in a fob transceiver held by the user. An identification transmitter within the fob transceiver then transmits an identification/data signal which is received by a receiver in the vehicle transceiver. Upon receipt, the vehicle transceiver actuates the vehicle locks from one of its outputs.

Use of the present invention provides a hands-free remote entry system which wakes up upon sensing an object. As a result, the aforementioned disadvantages associated with current remote entry systems have been substantially eliminated.

BRIEF DESCRIPTION OF THE DRAWINGS

Still other advantages of the present invention will become apparent to those skilled in the art after reading the following specification and by reference to the following drawings in which:

FIGS. 8A and 8B is a flow diagram for hands-free unlocking sequence; and

FIGS. 9A and 9B is a flow diagram for hands-free locking sequence.

DETAILED DESCRIPTION OF THE PREFERRED EMBODIMENT

The following description of a hands-free remote entry system for vehicles is merely exemplary in nature and is in no way intended to limit the invention or its applications or uses. Moreover, while this invention is described below in connection with a vehicle having a driver door, a passenger door and a trunk lid, those skilled in the art would readily recognize that the hands-free remote entry system can be utilized with various other vehicles having different configurations, including various types of land-based vehicles. In addition, the remote entry system can also be utilized in the home, as well as in commercial buildings.

Figure 1:
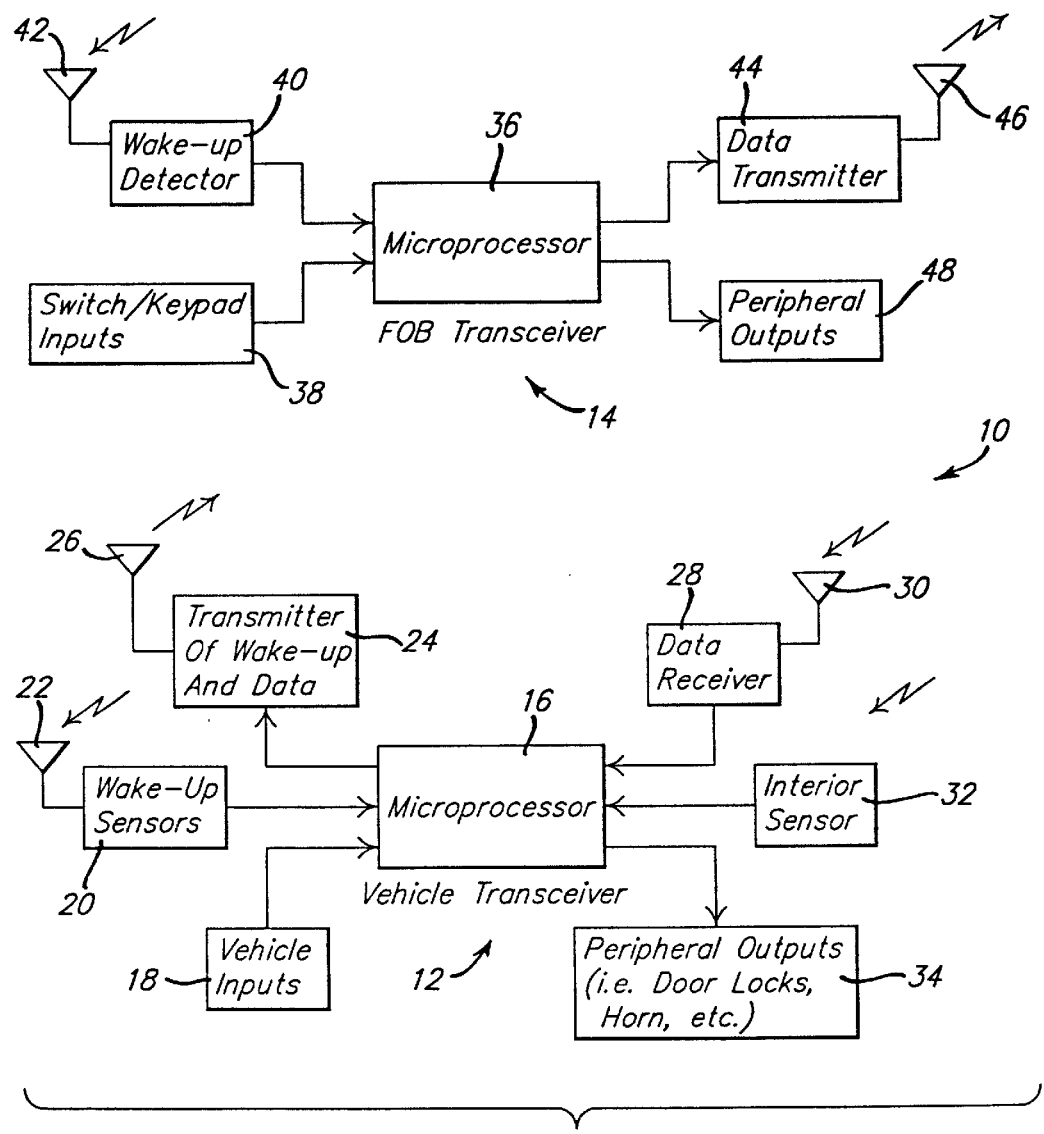
FIG. 1 is a schematic block diagram of the preferred embodiment of the present invention.

Referring to FIG. 1, a schematic block diagram of the preferred embodiment of a hands-free remote entry system 10, is shown. The remote entry system 10 includes a vehicle or base transceiver 12 and a fob or portable transceiver 14. The vehicle transceiver 12 is mounted within a vehicle (not shown in FIG. 1) and the fob transceiver 14 is a portable hand held transceiver which is carried by a user. The fob transceiver 14 is preferably a battery powered key fob that easily fits within the user's hand or pocket and acts as a keychain for the vehicle keys.

The vehicle transceiver 12 includes a microprocessor 16 which is preferably a Motorola 05 series 8 bit microprocessor. The microprocessor 16 includes at least four (4) inputs and two (2) outputs. One of the inputs to the microprocessor 16 consists of various vehicle inputs 18. The vehicle inputs 18 consist of inputs such as door jam switches, ignition sensing and door lock actuators.

Another input to the microprocessor 16 consists of wake-up sensors 20 having integral antennas 22. The wake-up sensors 20 are preferably doppler sensors such as GEC Plessy DA-5810. These wake-up sensors 20 are utilized to detect approaching objects within various zones about the vehicle. One skilled in the art would also recognize that various other sensors such as volumetric or infrared sensors may be utilized to achieve similar sensing. Upon sensing an object with one of a plurality of the wake-up sensors 20, the microprocessor 16 transmits wake-up information and data, via transmitter 24 and antenna 26 to the fob transceiver 14. The transmitter 24 transmits the wake-up and data signals sequentially from different zones about the vehicle to determine the location of the fob transceiver 14. The transmitter 24 is preferably a Colpitts oscillator which is modulated by the microprocessor 16, known in the art as an on/off keying (OOK) or an amplitude shift keying (ASK) transmitter.

During the above process, the microprocessor 16 receives identification and data signals from the fob transceiver 14, via a data receiver 28 having an antenna 30. The data receiver 28 is preferably a super-hetrodyne AM receiver which is capable of receiving on/off key or amplitude shift key transmissions, via its integral antenna 30. One skilled in the art would recognize that a super-regenerative receiver may also be used. An interior sensor 32 also provides an input to the microprocessor 16 which identifies whether or not a user or an object is within the vehicle. The interior sensor 32 is preferably a doppler sensor manufactured by GEC Plessy, Part No. DA-5810. The interior sensor 32 may also consist of sensors such as volumetric sensors, infrared sensors or seat switch sensors which identify whether an object is positioned in a seat. The microprocessor 16 is also connected to various peripheral outputs 34, via high current drivers (not shown). These peripheral outputs 34 include systems such as door locks, horns, anti-theft systems and vehicle lights.

The fob transceiver 14 includes a microprocessor 36 which is also preferably a Motorola 05 series 8 bit microprocessor. The microprocessor 36 includes at least two (2) or more inputs and two (2) or more outputs. One of the inputs of the microprocessor 36 includes switch/keypad inputs 38 which are positioned on the fob transceiver 14. The switch/keypad inputs 38 allow a user to manually actuate the fob transceiver 14. The other input to the fob transceiver 14 is supplied by a wake-up detector 40. The wake-up detector 40 is preferably a zero bias diode detector having an integral antenna 42. The wake-up detector 40 receives the wake-up and data signals from the transmitter 24 of the vehicle transceiver 12.

Upon receipt of the wake-up and data signals, the microprocessor 36 transmits identification and data signals, via a data transmitter 44. The transmitter 44 is preferably a Colpitts oscillator which produces an on/off keying (OOK) or amplitude shift keying (ASK) signal as the oscillator is toggled on and off by the microprocessor 36. The transmitter 44 transmits the identification and data signals, via an integral antenna 46. The microprocessor 36 also drives various peripheral outputs 48. The peripheral outputs 48 consist of audible and visual warnings located on the fob transceiver 14, such as beepers or LED's which are used to communicate to the user the status of the handsfree remote entry system 10.

Figure 2:
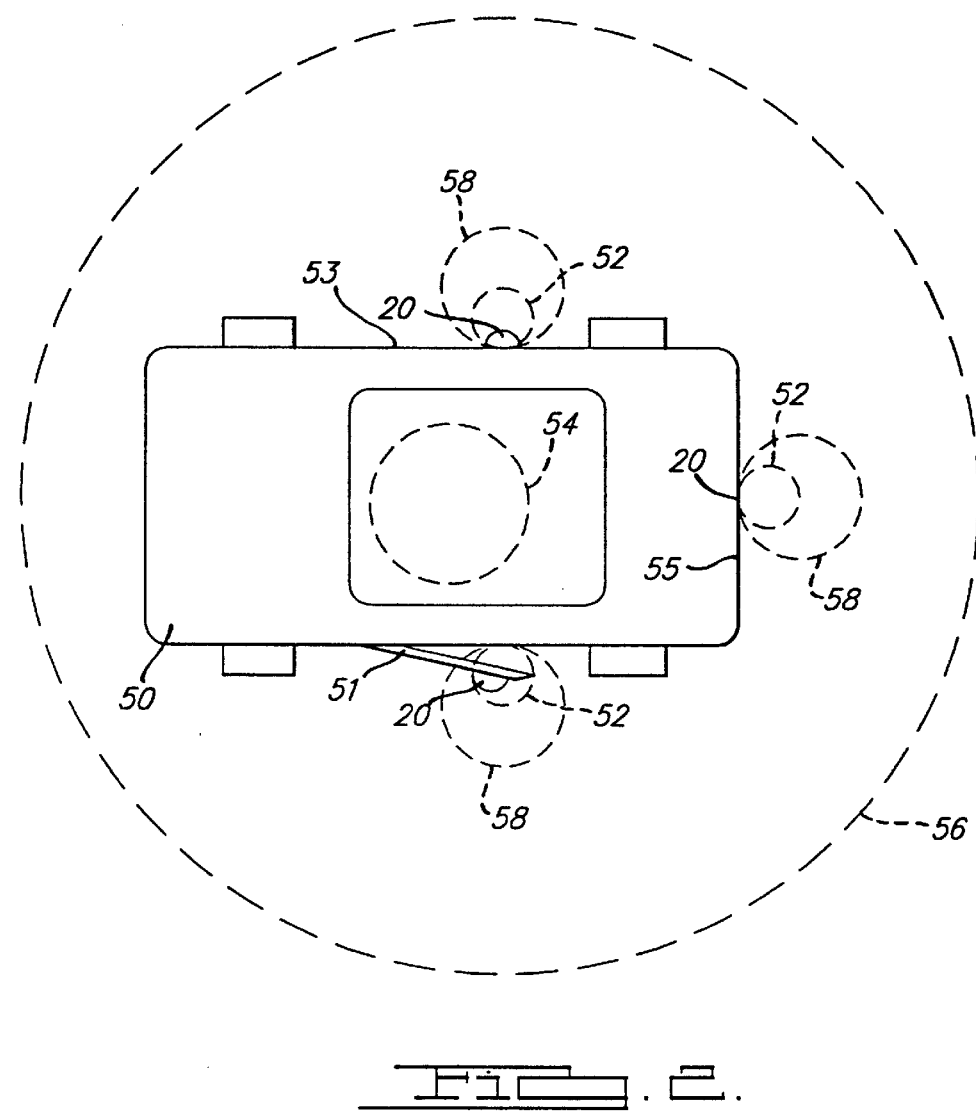
FIG. 2 is a range diagram identifying various zones about a vehicle.

Turning to FIG. 2, a vehicle 50 is shown which is equipped with the hands-free remote entry system 10. Positioned about the vehicle 50 are three wake-up sensors 20, one positioned at a driver door 51, one positioned at a passenger door 53, and the third positioned at a trunk lid 55. The wake-up sensors 20 detect approaching objects within the zones 52. The zones 52 are generally circular zones having diameters of about 1 to 2 feet. The interior sensor 32 also detects whether a user or an object is inside a zone 54 within the interior of the vehicle 50. The fob transceiver 14 has a transmitter range identified by a zone 56 in which the fob transceiver 14 can manually activate the remote entry system 10, via the switch/keypad inputs 38. Transmit and receive zones 58 are formed by the transmitter antenna 26 and the receiver antenna 30 of the vehicle transceiver 12. Zones 58 are generally circular in shape and have diameters of about 3 to 4 feet. In order for the fob transceiver 14 to receive wake-up and data signals from the transmitter 24, the fob transceiver 14 has to be within one of the zones 58. This allows the vehicle transceiver 12 to determine where the fob transceiver 14 is positioned about the vehicle 50.

Figure 3:
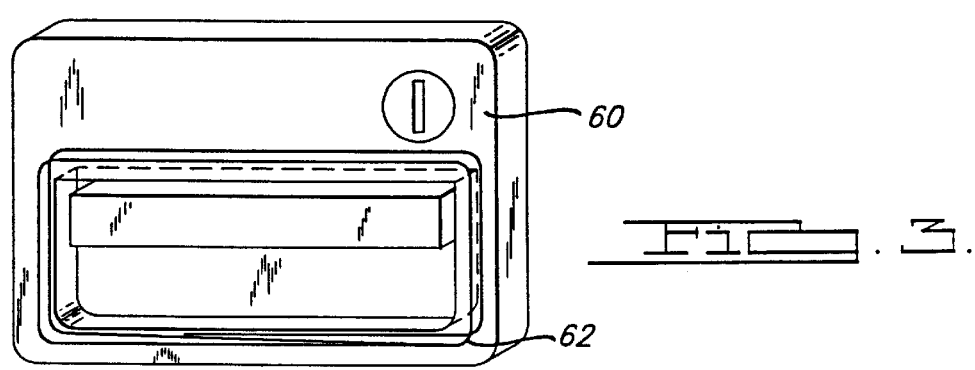
FIG. 3 is a door handle incorporating a coil antenna for a doppler or volumetric sensor.
Figure 4:
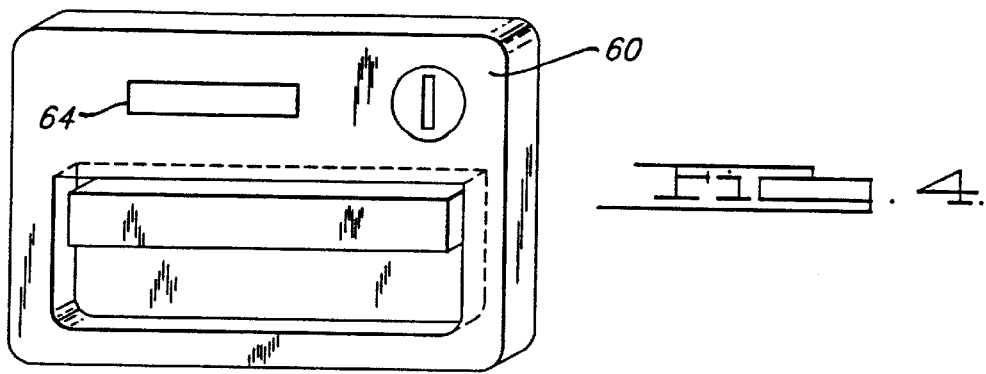
FIG. 4 is a door handle incorporating a patch/slot antenna for a doppler or volumetric sensor.
Figure 5:
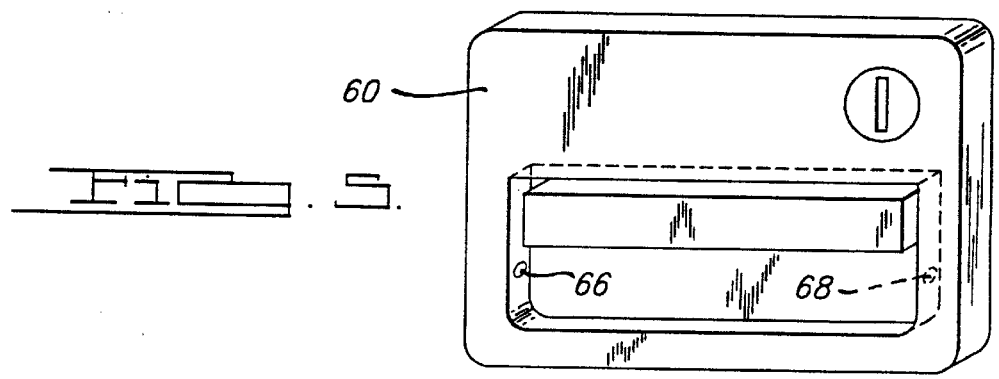
FIG. 5 is a door handle incorporating an infrared sensor.

Referring to FIGS. 3–5, a plastic door handle assembly 60, is shown, which incorporates various antennas employed in the remote entry system 10. In FIG. 3, a coil antenna 62 is shown positioned about the periphery of the door handle 60 which is used by the wake-up sensors 20 when either a doppler or volumetric sensor is employed. In FIG. 4, a slot/patch antenna 64 is shown which can also be utilized by the wake-up sensors 20 when the doppler or volumetric sensors are employed. In FIG. 5, wake-up sensors 20 are shown configured when infrared sensors are employed. The infrared sensors consist of an infrared emitter 66 and an infrared receiver 68. It should also be noted that when the infrared emitter 66 and receiver 68 are employed, the door handle 60 does not have to be constructed of plastic and therefore may be constructed of a metal or conductive material.

Figure 6:
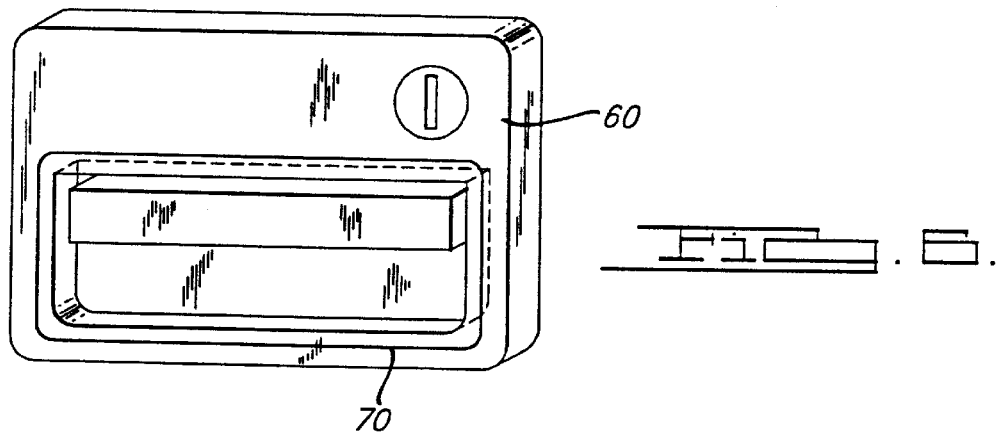
FIG. 6 is a door handle incorporating a loop antenna.
Figure 7:
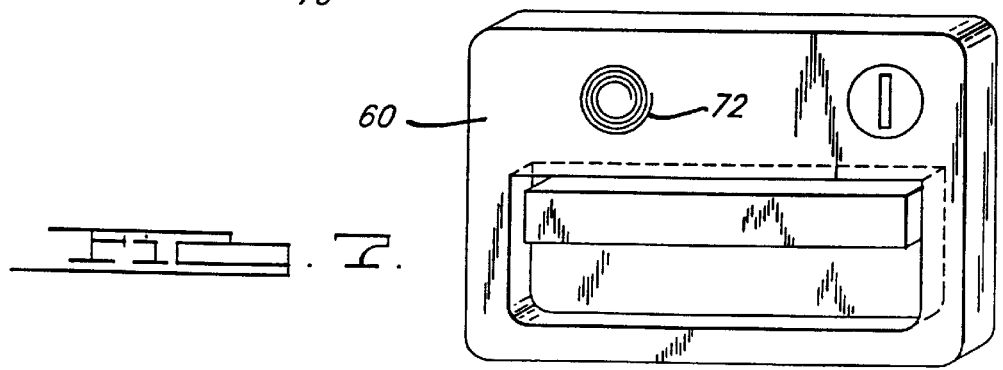
FIG. 7 is a door handle incorporating a spiral antenna.
Figure 5A:
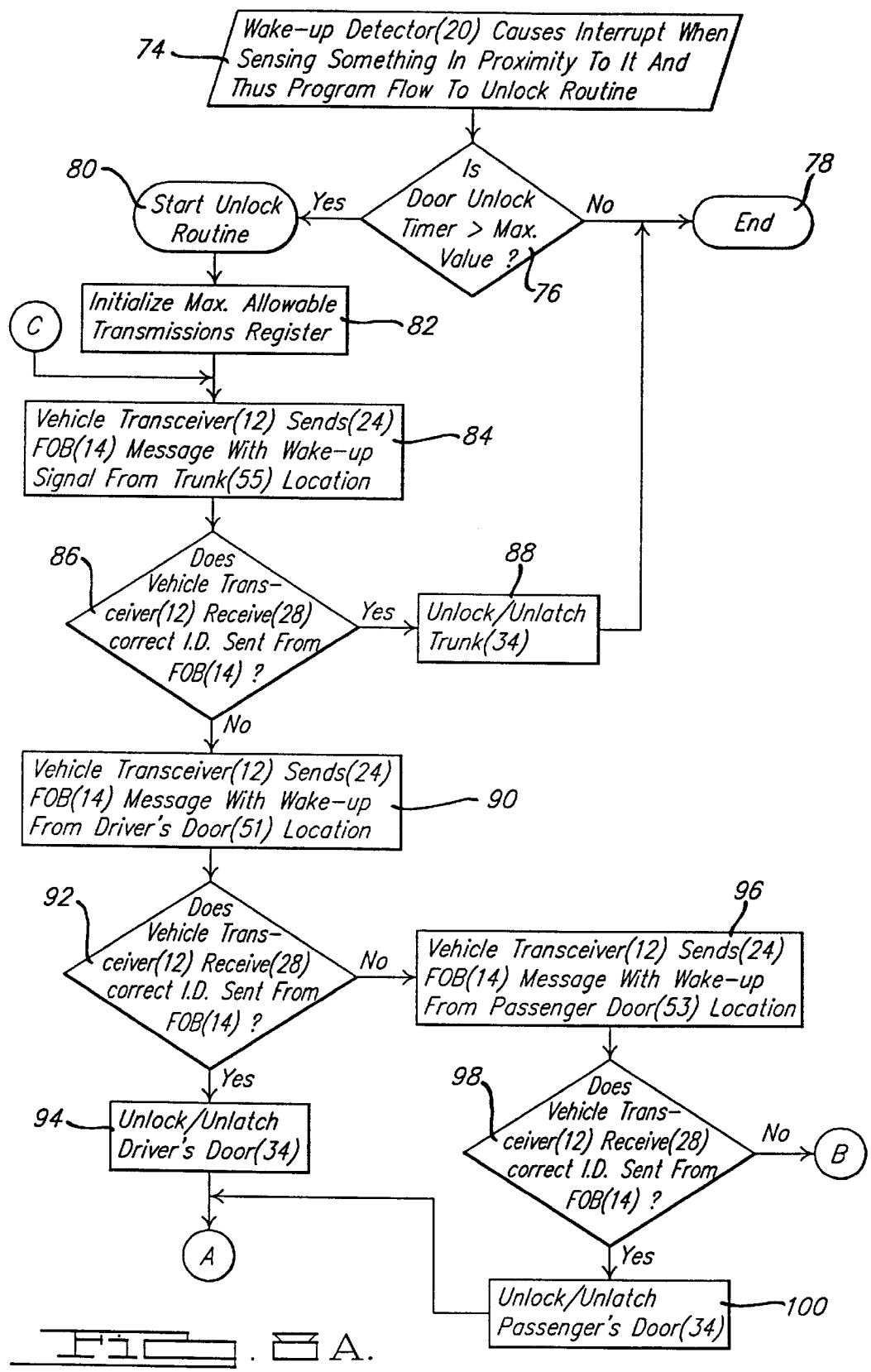

In FIGS. 6–7, vehicle transmit and receive antennas are shown. In FIG. 6, a loop antenna 70 is shown, which can either be used by the transmitter 24 or the receiver 28. Additionally, one skilled in the art would also recognize that only one antenna 70 may be utilized by both the transmitter 24 and the receiver 28, thereby incorporating the antennas 26 and 30 into one common antenna. In FIG. 7, a spiral antenna 72 is shown, which can also be used by either the transmitter 24 or the receiver 28. The positioning of the above-identified sensors and antennas allows the hands-free remote entry system 10 to be very directional and operate in close proximity to the action being taken. Because of this, the remote entry system 10 can clearly identify where the fob transceiver 14 is positioned about the vehicle 50 so that only the required door 51 or 53 or trunk lid 55 is opened, while the others remain locked.

Briefly, to unlock a door, the hands-free remote entry system 10 operates as follows. As a user approaches the vehicle 50, one of the wake-up sensors 20 will detect the user within one of the zones 52. For example, assuming the user is approaching the driver door 51, the user's hand will be detected by the wake-up sensor 20 positioned at the driver door 51. Upon detecting the user, the wake-up sensor 20 causes the microprocessor 16 to wake-up to a full operational mode. The microprocessor 16 then transmits wake-up and data signals, via the transmitter 24 sequentially from each zone 58. Assuming the fob transceiver 14 is within one of the zones 58, the wake-up detector 40 will receive the wake-up and data signals and wake-up the microprocessor 36 to its full operational mode. The microprocessor 36 will then transmit identification and data signals, via transmitter 44. The data receiver 28 will receive these signals within one of the zones 58, where one of the antennas 30 is positioned. The microprocessor 16 in the vehicle transceiver 12 will then unlock the driver door 51 from which the identification and data signals are received, via its peripheral outputs 34.

To initiate a locking routine, the microprocessor 16 will first monitor its vehicle inputs 18 to insure that the ignition is off, the driver's door 51 is closed, and that there are no users within the zone 54 inside the automobile 50, via the interior sensor 32. Upon verifying these conditions, the microprocessor 16 will transmit a door lock signal, via transmitter 24 to the fob transceiver 14 which indicates that the vehicle 50 is to be locked. If the fob transceiver 14 receives the lock signal with the correct identification and data signals within zone 58, via the wake-up detector 40, the fob transceiver 14 sends a door lock message, via the data transmitter 44 which will be received by the data receiver 28. The microprocessor 16 will lock the vehicle doors 51 and 53, via the peripheral outputs 34. Thereafter, the microprocessor 16 will transmit a "secured vehicle" message, via the transmitter 24. The fob transceiver 14 should receive this message, via its wake-up detector 40 and provide a message to the user that the vehicle 50 is secured, via its peripheral outputs 48.

With reference to FIGS. 8A and 8B, a detailed flow chart on the unlocking routine for the hands-free remote entry system 10, is shown. The routine begins at detection block 74 where one of the wake-up sensors 20 detects an object, thus causing the hands-free remote entry system 10 to enter the unlock routine. Upon beginning the unlock routine, decision block 76 determines whether a door unlock timer is greater than a maximum value. This determination is made so that if the vehicle 50 has just been locked and the user checks the door handle 60 to ensure that the door is locked, this will not cause the remote entry system 10 to unnecessarily enter into the unlock routine to unlock the door. Thus, if the door unlock timer is less than the maximum value, indicating that the doors have recently been locked, the unlocked routine ends at end block 78. If the timer is greater than the maximum value, the routine proceeds to the start block 80 to start the unlock routine. The unlock routine first begins with block 82 where the maximum allowable transmission register is initialized. This register limits the number of transmissions that can be sent by the transmitter 24 before the unlock routine ends.

Upon initializing this register, the routine proceeds to block 84 where polling for the fob transceiver 14 begins. The transmitter 24 first sends a wake-up message to the fob transceiver 14 from the trunk lid location 55. At decision block 86, a determination is made whether the vehicle transceiver 12 received the correct identification signal, via the receiver 28 from the fob transceiver 14. If the vehicle transceiver 12 receives the correct identification signal, the vehicle transceiver 12, unlocks the trunk lid 55, via its peripheral output 24 at block 88 and then ends the routine at end block 78.

If the vehicle transceiver 12 does not receive the identification signal, the routine proceeds to block 90 where the vehicle transceiver 12 poles the fob transceiver 14 from the driver door 51. At decision block 92, the vehicle transceiver 12 again determines whether or not it has received the correct identification signal from the fob transceiver 14. If the vehicle transceiver 12 does receive the correct identification signal, the routine proceeds to block 94 which unlocks the driver door 51. If the vehicle transceiver 12 does not receive the correct identification signal from the fob transceiver 14, the routine progresses to block 96 where the vehicle transceiver 12 poles the fob transceiver 14 from the passenger door 53. At decision block 98, the vehicle transceiver 12 again determines whether or not it has received the correct identification signal from the fob transceiver 14. If the vehicle transceiver 12 receives the correct identification signal from the fob transceiver 14, the routine progresses to block 100 where the passenger door 53 is unlocked.

If the vehicle transceiver 12 does not receive the proper identification signal, the routine progresses to decision block 102 where it is determined whether or not the maximum allowable number of transmissions has been reached. This ensures that the vehicle transceiver 12 does not continue to pole for the fob transceiver 14, if the fob transceiver 14 is not within the area. Such a condition may occur if a user approaches the vehicle 50 and then walks away from the vehicle 50, thereby initiating the unlock routine but removing the fob transceiver 14 from zones 58 so that the routine cannot be completed. Accordingly, if the maximum allowable transmissions have been reached, the routine ends at end block 78. If the maximum has not been reached, the transmission register is incremented by one at block 104 and then returns the unlock routine back to polling for the fob transceiver 14. A typical maximum will be about 3 or 4 polings about the vehicle 50.

After the driver door 51 or the passenger door 53 has been unlocked (blocks 94 or 100), the routine proceeds to block 106 where a door open timer is initialized. This phase of the routine ensures that the doors 51 or 53 will be relocked if they are not opened, which would occur if the user approaches the vehicle, the fob transceiver 14 responds but the user then decides not to enter the vehicle 50. Upon initializing the door open timer, the routine proceeds to decision block 108 to determine whether or not one of the doors 51 or 53 has been opened. If one of the doors has been opened, the routine ends at end block 78. If one of the doors 51 or 53 has not been opened, the vehicle transceiver 12 sends the fob transceiver 14 a "still in area" message at block 110 which informs the user that the vehicle 50 is unlocked, via the peripheral output 48.

The routine then proceeds to decision block 112 to determine whether the fob transceiver 14 has responded to the vehicle transceiver 12 with the correct identification and message. If the vehicle transceiver 12 does not receive the correct identification and message it is assumed that the user has left the vicinity about the vehicle 50 and no longer wishes to enter the vehicle 50. In this case, block 114 locks all the doors and activates the anti-theft system before the routine ends at block 78. If the vehicle transceiver 12 does receive the correct identification message, the routine proceeds to decision block 116 which determines whether the door open timer has reached a maximum allowable value. This decision block 116 ensures that the vehicle 50 will be locked after an initial period of time if the user remains in the vicinity of the vehicle 50 but does not enter the vehicle 50. Thus, if the maximum time has been reached, the process again proceeds to block 114 where all the doors are locked and the anti-theft system is armed. If the door open timer has not reached its maximum value, the routine returns to decision block 108 to determine whether the door has been opened and repeats this portion of the routine.

Figure 9A:
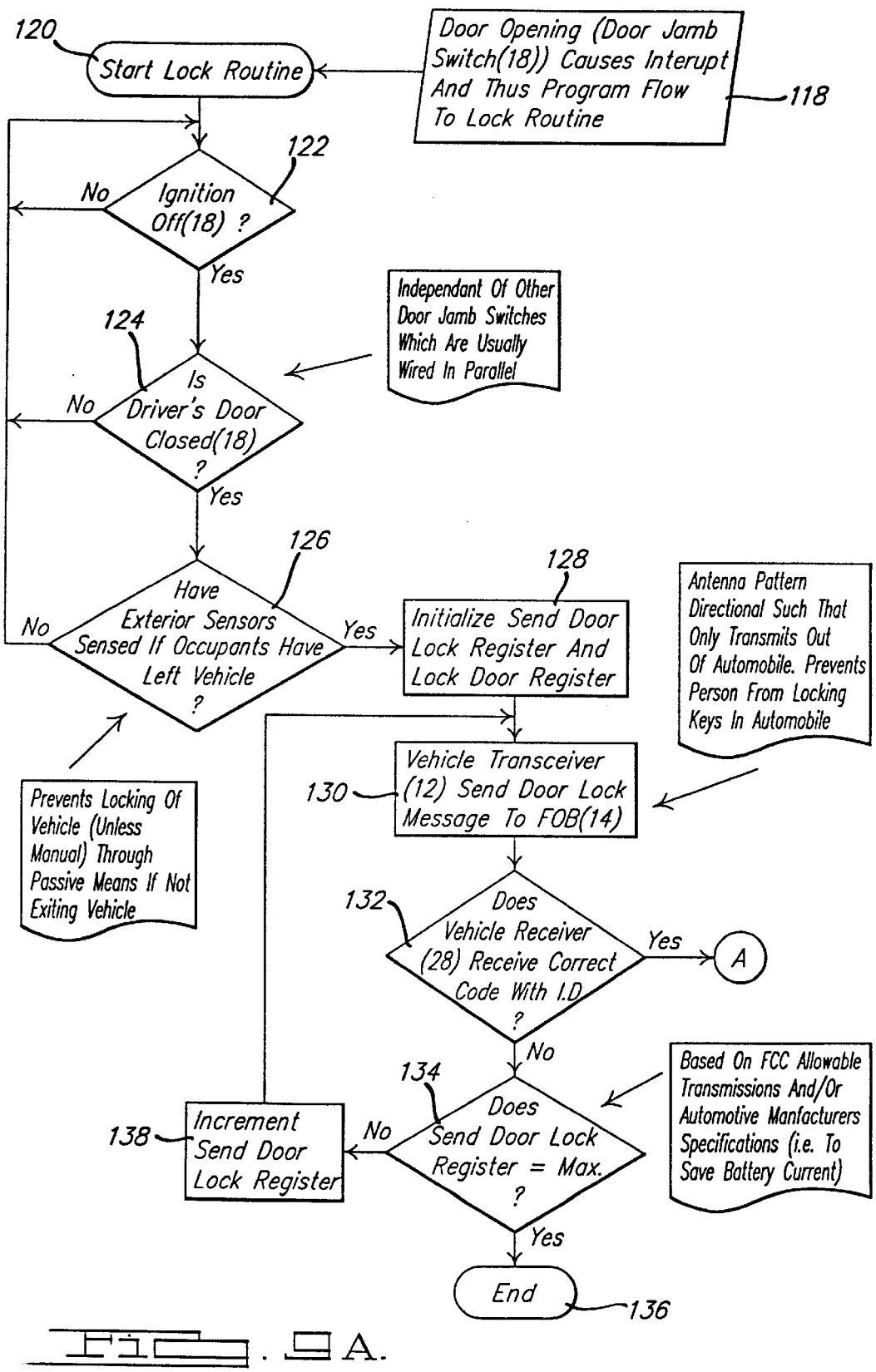

Referring to FIGS. 9A and 9B, the detailed locking routine for the hands-free remote entry system 10, is shown. The routine first determines at block 118 whether the vehicle transceiver 12 senses a door opening from a door jam switch, via vehicle inputs 18. If so, this causes the locking routine to begin at start block 120. Upon initiating the locking routine, the routine passes through decision blocks 122, 124 and 126. Decision block 122 determines whether the vehicle ignition has been turned off, decision block 124 determines whether the driver door has been closed and decision block 126 determines whether the occupants have left the vehicle 50, via the interior sensor 32. This portion of the routine prevents the locking of the vehicle 50 through passive means if the occupants have not exited the vehicle 50. If all of the conditions for blocks 122–126 have been met, the routine progresses to block 128 which initializes the send door lock and lock door registers.

Upon initializing the registers, the routine progresses to block 130 where the vehicle transceiver 12 sends a door lock message to the fob transceiver 14. Once the door lock message has been sent, the routine moves to decision block 132 which determines whether the vehicle transceiver 12 has received the correct identification and data back from the fob transceiver 14. If the vehicle transceiver 12 does not receive the correct identification signal from fob transceiver 14, the routine passes to decision block 134 which determines whether the send door lock register has reached a maximum value. The decision block 132 prevents the system 10 from continuing to forward "send door lock" messages indefinitely. If the send door lock register has reached its maximum, the routine passes to end block 136 to end the routine. If the send door lock register has not reached its maximum, it passes to block 138 which increments the register by one before returning to block 130.

If the vehicle transceiver 12 receives the proper code, the routine progresses to block 140 which locks the doors and starts a door unlock timer. Once the doors have been locked, the routine passes to decision block 142 which determines whether the doors have actually been locked and the door jambs are closed based on monitoring the door lock actuators, via vehicle inputs 18. If the doors are locked and the door jambs are closed, this indicates a secure vehicle 50 and the routine moves to block 144 which arms the vehicle theft system and then to block 146 where the vehicle transceiver 12 sends the fob transceiver 14 a "secure vehicle" message.

Once the "secure vehicle" message is sent, decision block 148 determines whether the fob transceiver 14 received this message. If the fob transceiver 14 does not receive the message, the routine ends at block 136. If the fob transceiver 14 does receive the "secure vehicle" message, the fob transceiver 14 informs the user that the vehicle 50 is secured, via the peripheral outputs 48 at block 150. The user can be warned by the fob transceiver 14 beeping or lighting an LED or by any other audible or visual means. This warning would relieve the system 10 from providing a horn chirping to indicate the vehicle 50 is secured which may be a violation of a local ordinance.

If the decision block 142 determines that the doors are not locked or the door jamb switches have not been closed, which typically indicates that the door has been locked, but not closed by the user, the routine moves to decision block 152 which determines if the lock door register equals a maximum value. If the lock door register does not equal the maximum value, block 154 increments the lock door register and progresses to decision block 156. At decision block 156, it is determined whether the door actuators have been locked, thereby verifying that the doors are in fact locked. If the doors have been locked, the routine returns to decision block 142 to verify whether the doors have also been closed. If the doors have not been locked, the routine progresses to block 140 which locks the doors and returns to decision block 142.

If the door jambs are not closed and the door lock register reaches the maximum value, the routine proceeds to block 158 where the vehicle transceiver 12 forwards a "nonsecured vehicle" message to the fob transceiver 14. After the nonsecured vehicle message is sent, the routine progresses to decision block 160 which again checks if the door jambs have been closed and the doors are locked. If so, the routine returns to block 144 and the vehicle theft system is armed. If the door jambs are not closed and the doors are locked, the routine progresses to decision block 162 which determines whether the vehicle transceiver 12 has received a "manual lock" message from the fob transceiver 14. If the vehicle transceiver 12 receives the "manual lock" message, the anti-theft system is armed at block 164 and the routine ends at block 136. If the "manual lock" message is not received, the routine passes to decision block 166 which determines whether the maximum number of "nonsecured vehicle" messages have been transmitted. If so, the routine progresses to block 164 which arms the anti-theft system and ends at block 136. If not, the routine moves to block 168 which increments the number of transmissions and returns to block 158 to send a new "nonsecured vehicle" message.

The foregoing discussions disclose and describes merely exemplary embodiments of the present invention. One skilled in the art would readily realize from such a discussion, and from the accompanying drawings and claims, the various changes, modifications and variations can be made therein with departing from the spirit and scope of the invention as defined by the following claims.

What is claimed is:

1. A hands-free remote entry system sensitive to the presence of an object and, said system comprising:
    a base transceiver having a sleep mode and an active mode of operation, said base transceiver comprising:
        a wake-up sensor for switching from said sleep mode to said active in response to detecting the object;
        a base transmitter for transmitting a wake-up/data signal in response to detecting the presence of the object;
        a base receiver for receiving an identification/data signal; and
        an output actuator for actuating the system; and
    a fob transceiver having a sleep mode and active mode of operation comprising:
        a wake-up receiver for switching said fob transceiver from said sleep mode to said active mode in response to receiving said wake-up/data signal; and
        an identification transmitter for transmitting said identification/data signal in response to said wake-up receiver receiving said wake-up/data signal, wherein said output actuator actuates the system upon receipt of said identification/data signal by said base receiver.

2. The hands-free remote entry system as defined in claim 1 wherein said wake-up sensor comprises a sensor selected from the group consisting of a doppler sensor, a volumetric sensor and an infrared sensor.

3. The hands-free remote entry system as defined in claim 1 wherein said wake-up sensor comprises a plurality of sensors.

4. The hands-free remote entry system as defined in claim 3 wherein one of said sensors is positioned in close proximity to a driver door, one of said sensors is positioned in close proximity to a passenger door, and one of said sensors is positioned in close proximity to a trunk lid.

5. The hands-free remote entry system as defined in claim 4 wherein each of said sensors has a sensing range in close proximity to where said sensor is positioned.

6. The hands-free remote entry system as defined in claim 1 wherein said base transmitter transmits a directional localized wake-up/data signal.

7. The hands-free remote entry system as defined in claim 6 wherein said base transmitter transmits said directional localized wake-up/data signal sequentially at multiple positions around a vehicle.

8. The hands-free remote entry system as defined in claim 7 wherein said base transmitter is a colpitts oscillator.

9. The hands-free remote entry system as defined in claim 1 wherein said base receiver is a super-regenerative receiver.

10. The hands-free remote entry system as defined in claim 1 wherein said system actuated by said output actuator comprises a vehicle lock.

11. The hands-free remote entry system as defined in claim 10 wherein said system actuated by said output actuator further comprises an anti-theft device.

12. The hands-free remote entry system as defined in claim 1 wherein said base transceiver further comprises an interior sensor for sensing an object within a vehicle.

13. The hands-free remote entry system as defined in claim 12 wherein said interior sensor comprises a sensor selected from the group consisting of a doppler sensor, a volumetric sensor, an infrared sensor and a seat switch sensor.

14. The hands-free remote entry system as defined in claim 1 wherein said base transceiver further comprises a microprocessor for receiving a plurality of vehicle input data.

15. The hands-free remote entry system as defined in claim 1 wherein said fob transceiver further comprises an output warning device for generating a warning when said system has been actuated, said output warning device providing at least one of an audible warning and visible warning.

16. The hands-free remote entry system as defined in claim 1 wherein said fob transceiver further comprises a switch for manually actuating the transmission of said identification/data signal.

17. A hands-free remote entry system for remotely actuating a plurality of vehicle locks, said system being sensitive to the presence of an object and comprising:
   a base transceiver having a sleep mode and an active mode of operation, said base transceiver comprising:
      a plurality of wakeup sensors for switching from said sleep mode to said active mode in response to detecting the object within one of a plurality of zones positioned about a vehicle to wake-up said base transceiver;
      a base transmitter for transmitting a wake-up/data signal sequentially from each of said zones in response to detecting the object;
      a base receiver for receiving an identification/data signal from one of said zones; and
      an output actuator for actuating at least one of the plurality of vehicle locks, each of the plurality of the zones associated with at least one of said plurality of vehicle locks; and
   a fob transceiver comprising:
      a wake-up receiver for receiving said wake-up/data signal from one of said zones to wake-up said fob transceiver; and
      an identification transmitter for transmitting said identification/data signal from one of said plurality of zones in response to said wake-up receiver receiving said wake-up/data signal, wherein said output actuator actuates the at least one of the vehicle locks associated with the zone from which said identification/data signal is transmitted by said fob transceiver.

18. The hands-free remote entry system as defined in claim 17 wherein said plurality of wake-up sensors comprises a plurality of sensors selected from the group consisting of a doppler sensor, a volumetric sensor and an infrared sensor.

19. The hands-free remote entry system as defined in claim 18 wherein said sensors are positioned within door handles of said vehicle.

20. The hands-free remote entry system as defined in claim 17 wherein said base transceiver further comprises an interior sensor for detecting an object within said vehicle, wherein said output actuator is inhibited from actuating one of said vehicle locks if an object is detected within said vehicle.

21. The hands-free remote entry system as defined in claim 20 wherein said interior sensor comprises a sensor selected from the group consisting of a doppler sensor, a volumetric sensor, an infrared sensor and a seat switch sensor.

22. A method for remotely locking and unlocking a vehicle lock in a hands-free manner sensitive to the presence of an object, said method comprising the steps of:
   a) detecting the object in one of a plurality of zones about a vehicle;
   b) switching between a sleep mode of operation and an active mode operation in response to said step of detecting the object;
   c) transmitting a wake-up/data signal sequentially from each of said zones in response to said step of detecting the object;
   d) receiving said wake-up/data signal transmitted from a first one of said zones with a fob transceiver;
   e) transmitting an identification/data signal from said fob transceiver in response to said step d);
   f) receiving said identification/data signal from said fob transceiver; and
   g) actuating the vehicle lock at said first one of said zones in response to receiving said identification/data signal.

23. The method as defined in claim 22 further comprising the steps of:
   h) detecting a vehicle door opening;
   i) ensuring a vehicle ignition is off;
   j) ensuring a vehicle driver door is closed;
   k) ensuring an occupant has exited vehicle;
   l) transmitting a door lock signal after said steps h)–k);
   m) receiving said door lock signal with said fob transceiver;
   n) transmitting an identification/data signal from said fob transceiver in response to said door lock signal;
   o) receiving said identification/data signal after said step n); and p) locking a vehicle door in response to said step o).

24. The method as defined in claim 23 further comprising the steps of:

q) transmitting a secure vehicle message to said fob transceiver after said step o); and r) informing a user of a secured vehicle by said fob transceiver after said step q).

25. A method for remotely locking and unlocking a vehicle lock in a hands-free manner sensitive to the presence the presence of an object, said method comprising the steps of:

detecting the object in one of a plurality of zones about a vehicle;

switching between a sleep mode of operation and an active mode operation in response to said step of detecting the object;

transmitting a wake-up/data signal sequentially from each of said zones in response to said step of detecting the object;

receiving said wake-up/data signal transmitted from one said zones with a fob transceiver;

transmitting an identification/data signal from said fob transceiver;

receiving said identification/data signal from said fob transceiver;

actuating the vehicle lock at one of said zones in response to receiving said identification/data signal;

detecting a vehicle door opening;

ensuring a vehicle ignition is off;

ensuring a vehicle driver door is closed;

ensuring an occupant has exited vehicle;

transmitting a door lock signal;

receiving said door lock signal with said fob transceiver;

transmitting an identification/data signal from said fob transceiver;

receiving said identification/data signal;

locking a vehicle door;

transmitting a secure vehicle message to said fob transceiver; and informing a user of a secured vehicle by said fob transceiver.

* * * * *